| (12) United States Patent<br>Noggle | (10) Patent No.: US 8,033,764 B2<br>(45) Date of Patent: Oct. 11, 2011 |
|---|---|

(54) SIDE LOCKING INSERT AND MATERIAL REMOVAL TOOL WITH SAME

(75) Inventor: Kenneth G. Noggle, West Bloomfield, MI (US)

(73) Assignee: Sandvik, Inc., Fair Lawn, NJ (US)

( * ) Notice: Subject to any disclaimer, the term of this patent is extended or adjusted under 35 U.S.C. 154(b) by 0 days.

(21) Appl. No.: 12/461,104

(22) Filed: Jul. 31, 2009

(65) Prior Publication Data

US 2009/0290943 A1    Nov. 26, 2009

Related U.S. Application Data

(63) Continuation of application No. 11/409,089, filed on Apr. 24, 2006, now Pat. No. 7,607,868.

(51) Int. Cl.
*B23C 5/20* (2006.01)
*B26D 1/00* (2006.01)

(52) U.S. Cl. .......................... 407/113; 407/67

(58) Field of Classification Search .................... 407/66, 407/67, 87, 96, 97, 113, 40
See application file for complete search history.

(56) References Cited

U.S. PATENT DOCUMENTS

| 867,725 A | 10/1907 | Hemenway |
| 1,376,972 A | 5/1921 | Runde |
| 1,778,260 A | 10/1930 | Kearney |
| 1,866,570 A | 11/1932 | Metzger |
| RE21,068 E | 5/1939 | Miller |
| 2,255,737 A | 9/1941 | Ole |
| 2,343,709 A | 3/1944 | Rudaitis |
| 2,395,288 A | 2/1946 | Thomas |
| 2,499,994 A * | 3/1950 | Hart ............................... 407/108 |
| 2,743,917 A | 5/1956 | Krekeler et al. |
| 2,787,823 A | 4/1957 | Kennicott et al. |
| 2,985,119 A | 11/1960 | Hamill et al. |
| 3,509,612 A * | 5/1970 | Lankin ........................... 407/38 |
| 3,588,977 A | 6/1971 | Bellingham et al. |

(Continued)

FOREIGN PATENT DOCUMENTS

DE    34 10 284 A1    9/1985

(Continued)

OTHER PUBLICATIONS

English translation of a Chinese Office Action from corresponding Chinese Patent Application No. 200780014798.3 dated Oct. 12, 2010 (8 pages).

*Primary Examiner* — Will Fridie, Jr.

(74) *Attorney, Agent, or Firm* — Drinker Biddle & Reath LLP (57) ABSTRACT

An indexable insert has one or more recesses formed in a frontside or backside surface which receives a surface of the head of a locking screw. When mounted, the insert is forced against respective support surfaces of an insert pocket. The locking screw is threaded into a counterbored tap hole to engage the insert and provide side locating forces and clamping forces to secure the indexable insert in the insert pocket. More particularly, the indexable insert has a shaped surface recess that mates to a complimentarily-shaped surface on the head of a locking screw and secures the indexable insert in multiple dimensions to a seating surface. A material removal tool and a method of mounting the indexable insert are also disclosed.

27 Claims, 7 Drawing Sheets

U.S. PATENT DOCUMENTS

| | | |
|---|---|---|
| 3,765,496 A | 10/1973 | Flores et al. |
| 4,303,113 A * | 12/1981 | Andersson .................... 144/230 |
| 4,400,117 A * | 8/1983 | Smith .............................. 407/49 |
| 4,517,954 A | 5/1985 | deKok et al. |
| 4,934,880 A | 6/1990 | Stashko |
| 5,022,795 A | 6/1991 | Stampfli et al. |
| 5,716,167 A | 2/1998 | Siddle et al. |
| 5,827,016 A | 10/1998 | Strand |
| 6,427,791 B1 * | 8/2002 | Glowka et al. ................ 175/413 |
| 6,499,917 B1 | 12/2002 | Parker et al. |
| 6,508,612 B1 * | 1/2003 | Baca .............................. 407/43 |
| 6,607,335 B2 | 8/2003 | Morgulis |
| 6,789,983 B2 | 9/2004 | Mizutani |
| 7,040,843 B1 | 5/2006 | Martin |
| 7,118,311 B2 | 10/2006 | Aström |
| 2002/0028116 A1 | 3/2002 | Morgulis |
| 2007/0201959 A1 | 8/2007 | Priller et al. |

FOREIGN PATENT DOCUMENTS

| | | |
|---|---|---|
| FR | 2 589 765 A1 | 5/1987 |
| GB | 1 209 181 | 10/1970 |
| GB | 1 309 181 | 3/1973 |
| WO | WO 03/084703 A1 | 10/2003 |

\* cited by examiner

SIDE LOCKING INSERT AND MATERIAL REMOVAL TOOL WITH SAME

RELATED APPLICATION DATA

This application is a continuation application of U.S. application Ser. No. 11/409,089, filed Apr. 24, 2006, the entire contents of which are incorporated herein by reference.

FIELD

The present disclosure relates to an indexable insert and associated material removal tools. More particularly, the present disclosure relates to an indexable insert, such as a milling insert, a turning insert, a boring insert, a grooving insert or a parting insert, of any shape and either positive or negative, that can be secured to a tool and a method of securing the insert to the tool.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Known tools comprising replaceable inserts use various means for mounting the inserts to the tool body. Some known inserts are mounted with a locking screw passed through the center of the insert and secured in a taped hole in the insert seating surface. The axis of the taped hole may be perpendicular to the insert and the insert seating surface or the axis of the taped hole may be skewed. However, the density of inserts on the milling tool is limited because of the clearance required when taping the lock screw hole in the insert seating surface, and by the use of wedges and or clamps. In addition, the hole in the insert itself reduces the cross section of the insert, which can reduce insert performance such as strength, in particular for ceramic inserts such as silicon nitride (SiNi) inserts. Some known inserts are mounted with a set screw descending from a side of the insert seating surface. The point of the set screw inserts into and/or contacts, e.g., a depression in the surface of the insert to place the set screw in compression and press the insert against the insert seating surface. However, the chip room for this insert and tool may not be adequate and may foul the tool during operation.

Examples of milling cutters wherein inserts are mounted to the tool body using screws are illustrated in U.S. Pat. No. 4,934,880. Examples of milling cutters wherein inserts are held to the tool body by releasable clamps are illustrated in U.S. Pat. No. 3,588,977. GB 1,209,181 discloses a cutter with an insert secured in a slot by one or more screws.

Inserts for tooling and manufacturing perform under rigorous conditions during operations on iron components. Typically, different irons have different operating conditions and, therefore, different inserts are typically used. Some irons of interest include gray irons, nodular irons, high tensile irons and compacted graphite iron (CGI irons). An insert that may be operationally functional across more than one type iron would be advantageous. Other considerations for inserts include the type of surface provided (rough and finish), ease of indexing of inserts and change-out time of used inserts, secure seating to minimize "fling" of inserts under centrifugal forces, tool life, simple and commonly available accessories, compatibility with existing milling equipment and hardware and securing means that reliably and repeatably place inserts in secure seats.

SUMMARY OF THE INVENTION

An exemplary embodiment of an indexable insert has one or more recesses in a front and/or back surface which receives a surface of the head of a locking screw. When mounted, the indexable insert is forced tangentially, axially and radially against respective support surfaces of the insert pocket. The locking screw is placed in tension and deflected slightly so that the forces secure the indexable insert in the insert pocket. More particularly, the indexable insert has, in one example, a concave-shaped surface recess that mates to a corresponding convex surface on the head of a locking screw and secures the indexable insert in multiple directions to a seating surface.

An exemplary embodiment of an indexable insert comprises a body including a front polygonal surface, a back polygonal surface and a plurality of side edge surfaces joining the front polygonal surface and the back polygonal surface, the intersections of the side edge surfaces and the polygonal surfaces defining line edges of the insert and intersections of sequential side edge surfaces defining corner edges of the insert, and a receiver for a region of a head of a locking screw in the front polygonal surface, wherein the receiver includes a plurality of recesses, each recess having a surface that is complimentary to the region of the head of the locking screw.

An exemplary embodiment of a material removal tool comprises a tool body including a head with a plurality of insert pockets at a first end and an axially extending portion at a second end, the head having a diameter, and a plurality of indexable inserts, each of the plurality of indexable inserts seated in one of the plurality of insert pockets, wherein the plurality of indexable inserts are arranged on the head at a density of about 4 inserts per inch diameter of head.

Another exemplary embodiment of a material removal tool comprises a body with a plurality of insert pockets at a first axial end, each of the plurality of insert pockets including a wall supporting surface, a floor supporting surface and a threaded tap hole with a counterbore, the threaded tap hole having a centerline oriented at an angle to the floor supporting surface, an indexable insert including a front polygonal surface, a back polygonal surface and a plurality of side edge surfaces joining the front polygonal surface and the back polygonal surface, the intersections of the side edge surfaces and the polygonal surfaces defining line edges of the insert and intersections of sequential side edge surfaces defining corner edges of the insert, and including a receiver for a region of a head of a locking screw in the front polygonal surface, wherein the receiver includes a plurality of recesses, and wherein the indexable insert is seated in the insert pocket with the back polygonal surface contacting the floor supporting surface, with a first one of the plurality of side edge surfaces contacting the wall supporting surface, and with a second one of the plurality of side edge surfaces protruding radially past an outer peripheral surface of the body, and a locking screw for the threaded tap hole, the locking screw including a threaded portion, a concentric shoulder and an angular shoulder, the angular shoulder between the threaded portion and the concentric shoulder, wherein the locking screw inserted into the threaded tap hole engages a first region of the concentric shoulder and a first region of the angular shoulder against one of the plurality of recesses.

An exemplary method to mount an indexable insert on a material removal tool, the indexable insert including a body having a front polygonal surface, a back polygonal surface and a plurality of side edge surfaces joining the front polygonal surface and the back polygonal surface, the intersections of the side edge surfaces and the polygonal surfaces defining line edges of the insert and intersections of sequential side edge surfaces defining corner edges of the insert, and including a receiver in the front polygonal surface, wherein the receiver includes a plurality of recesses, the method comprising placing the indexable insert on a seating surface of an insert pocket of the material removal tool, and threading a lock screw including an angular shoulder and a concentric shoulder into a tap hole to engage a region of a head of the locking screw with one of the plurality of recesses.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIGS. 1-3 illustrate inserts that are solid bodies and FIGS. 4-6 illustrate inserts with a bore through the body.

DETAILED DESCRIPTION

Indexable inserts of interest herein have front and back surfaces of polygonal shape joined by side edges. At least portions of the intersections of the side edge surfaces with the polygonal surfaces define line edges of the insert and at least portions of the intersections of sequential side edge surfaces define corner edges of the insert. Line edges may be linear or non-linear, as known in the art; corner edges may be round, truncated or other geometries, as known in the art. In general, machining operations are performed so that cutting occurs at an insert corner formed by intersections of corner edges at corners of the polygonal surface, or are performed so that cutting, e.g., milling, occurs at line edges of the insert. In each case, the insert can be traversed along a workpiece surface as the workpiece rotates or the insert can be stationary as the workpiece is rotated and translated. Other combinations of relative motion between the indexable insert and the workpiece can also be used.

Exemplary embodiments of an indexable insert comprises a body and a receiver for a region of a head of a locking screw. FIGS. 1-6 show representative examples of embodiments of indexable inserts.

In the exemplary embodiments of FIGS. 1-6, the indexable insert 10 comprises a body 12 including a front polygonal surface 14, a back polygonal surface 16 and a plurality of side edge surfaces 18 joining the front polygonal surface 14 and the back polygonal surface 16. The intersections of the side edge surfaces 18 and the polygonal surfaces define line edges 20 of the insert 10 and the intersections of sequential side edge surfaces 18 define corner edges 22 of the insert 10. A receiver 24 for a region of a head of a locking screw is located in the front polygonal surface 14. The receiver includes a plurality of recesses 26. The recesses can be of any form. For example, the recess can be convex, concave or have one or more planar surfaces. Generally, the number of the plurality of recesses 26 is the same as a number of sides of the front polygonal surface 14. However, some indexable inserts have different numbers of recesses than numbers of cutting edges. In addition, a single recess may be used to secure the indexable insert in the insert pocket when one more than one cutting feature of the indexable insert is positioned, e.g., a wiper edge and a rough edge.

In some exemplary embodiments, an optional second receiver can be positioned on the back polygonal surface 16 of the body 12. In such an instance, the receiver can be as described and illustrated herein with respect to the receiver on the front polygonal surface 14. The optional second receiver allows mounting of the indexable insert for utilization of the line edges and corner edges associated with the back polygonal surface 16, thereby increasing the number of indexable positions for any one indexable insert.

The receiver 24 is located generally in a radial center of the indexable insert 10. In FIGS. 1-2 and 4-5, the receiver 24 has recesses 26 that are not adjacent to each other, but rather are separated from each other by a portion of the front polygonal surface 14. Nevertheless, the recesses 26 are positioned in the general area of the radial center, and when a bore is present, are positioned about the periphery of the bore. In FIGS. 3 and 6, the recesses are collocated in a contiguous structure in a radial center of the indexable insert 10. At least two adjacent recesses are separated by a ridgeline 28 or other transition area. In some embodiments, the ridgeline 28 is oriented such that a projection of the ridgeline 28 intersects at least one of the corner edges 22 of the indexable insert 10 or the long edges 20 of the indexable insert 10. In addition and in some embodiments, a number of ridgelines 28 or transition areas is the same as a number of corner edges 22 of the indexable insert 10. When a bore 30, used in aid of manufacturing the insert body, is present, the recesses 26 are positioned about the periphery of the bore 30.

Figure 1:
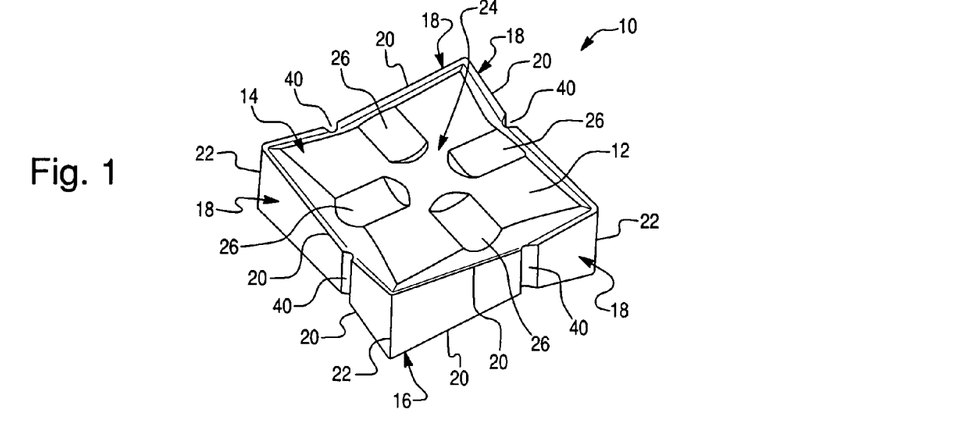
FIGS. 1-6 show representative examples of embodiments of indexable inserts.
Figure 2:
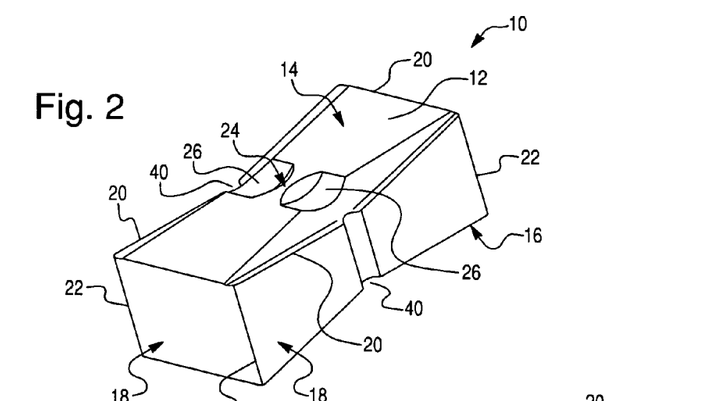
Figure 3:
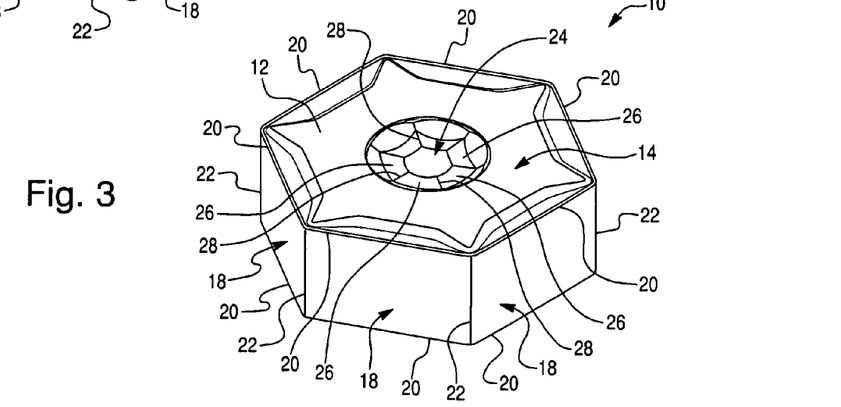
Figure 4:
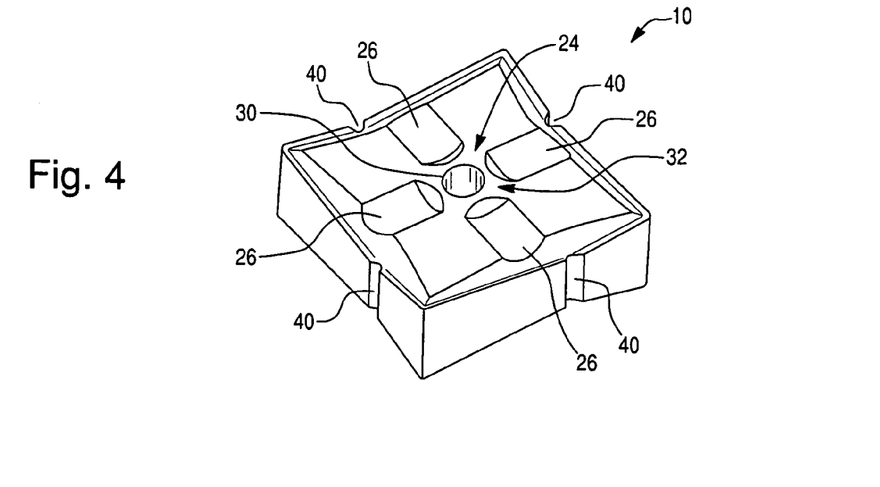
Figure 5:
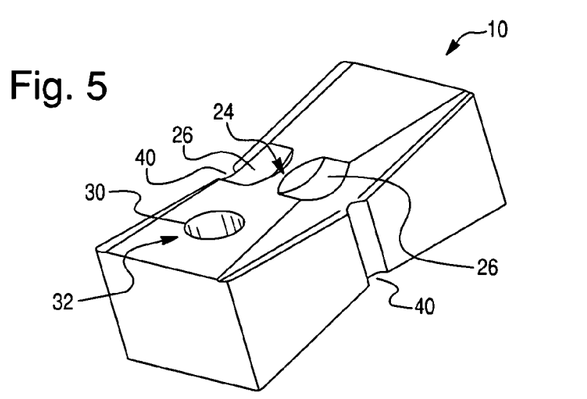
Figure 6:
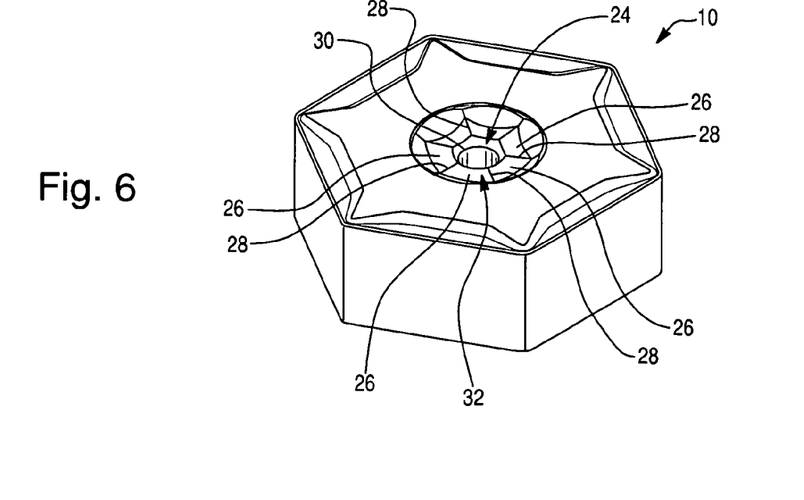

FIGS. 1-6 show non-limiting variations of the indexable insert 10. For example, the geometric shape of FIGS. 1-6 include squares, rectangles and hexagons, but other polygonal shapes can be utilized, including triangles, pentagons and trigons. In another example, FIGS. 1-3 illustrate indexable inserts 10 that are solid bodies 12, while FIGS. 4-6 illustrate indexable inserts 10 with a bore 30 through the body 12. Generally, the bore 30 is oriented axially in the radial center of the indexable insert 10. The plurality of recesses 26 of the receiver 24 can be arranged around a periphery 32 of the bore 30. In some embodiments, e.g., see FIG. 5, the bore is positioned off-center from the radial center of the indexable insert 10.

Other optional features shown in one or more exemplary embodiments in FIGS. 1-6 include one or more chip splitters 40, angling of surfaces to obtain desired material removing function and coatings (discussed further herein below).

Figure 7:
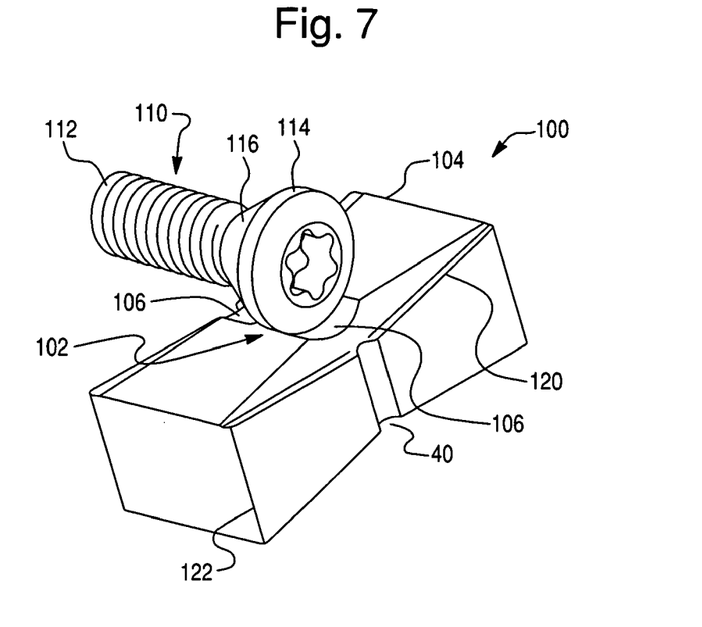
FIG. 7 illustrates the interaction between an exemplary embodiment of an indexable insert and a locking screw.
Figure 8:
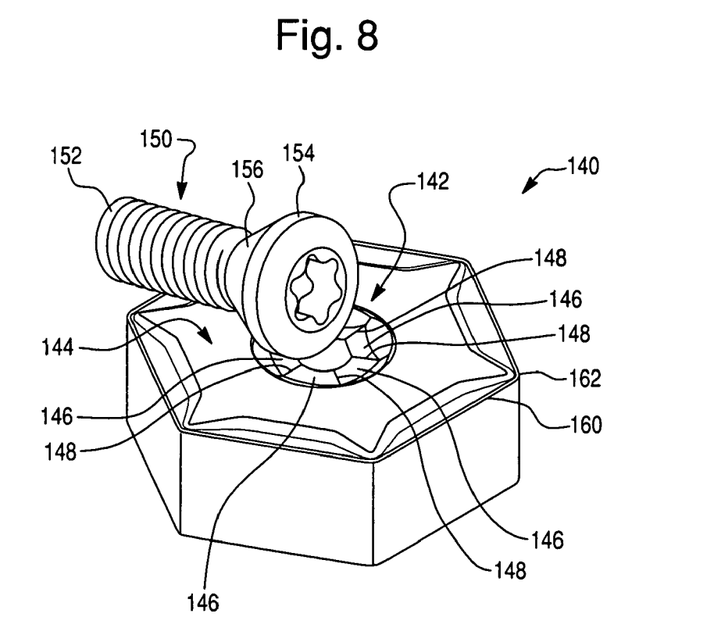
FIG. 8 illustrates the interaction between another exemplary embodiment of an indexable insert and a locking screw

In exemplary embodiments, the surfaces of the recesses of the receiver corresponds to a surface of the region of the head of the locking screw. FIGS. 7 and 8 illustrate the interaction between exemplary embodiments of indexable inserts and a locking screw. Although illustrated by concavely formed recesses and corresponding convexly formed regions of the head of the locking screw, it should be understood that the recesses can be of any form including concave, convex and planar and the corresponding regions of the head of the locking screw can be of any form that conforms to the recess when the region of the head of the locking screw engages the recess.

In the FIG. 7 example, an indexable insert 100 has a receiver 102 in a front polygonal surface 104. The receiver has two recesses 106, each having a concavity into the body of the indexable insert 100. The locking screw 110 includes a threaded portion 112, a concentric shoulder 114 and an angular shoulder 116. The angular shoulder 116 is between the threaded portion 112 and the concentric shoulder 114. In some instances, the angular shoulder 116 serves as a transition for the different diameters of the threaded portion and the concentric shoulder 114. The concentric shoulder 114 and the angular shoulder 116 are each shown with a surface that is convex, but can be planar, concave or convex or of any other form.

In some embodiments, the surface is conformal to the surface of the recess. For example, a convexity of the concentric shoulder 114 and the angular shoulder 116 corresponds to the concavity of the recesses 106 in the receiver 102. When the locking screw 110 is fully engaged, the convex concentric shoulder 114 and the angular shoulder 116 mate with the concave recess 106 across an increased surface area, and in some cases up to an entire surface area of the concave recess 106.

In other embodiments, the surface is not conformal of the surface is partially conformal to the surface of the recess. For example, the concavity, convexity, angularity or planarity of the centric shoulder and the angular shoulder can be different from the concavity, convexity, angularity or planarity of the surface of the recess. Also for example, the surfaces that meet can be 25%, 35%, 40%, 50%, 60%, 66%, 75% or more conformal, with higher degrees of conformity reducing stresses on the insert.

As shown in the FIG. 7 example, the locking screw 110 engages one of the plurality of recesses 106. In this example, the recess 106 is a recess closest to a material-removing feature of the indexable insert 100, such as line edge 120 for a milling insert. The receiver could be reoriented such that the recess 106 is closest to a different material-removing feature of the indexable insert 100, such as an insert corner 122 formed by intersections of corner edges at corners of the polygonal surface.

As shown in the FIG. 8 example, an indexable insert 140 has a receiver 142 in a front polygonal surface 144. The receiver has six recesses 146, each having a concavity into the body of the indexable insert 140. The locking screw 150 includes a threaded portion 152, a concentric shoulder 154 and an angular shoulder 156. The angular shoulder 156 is between the threaded portion 152 and the concentric shoulder 154. In some instances, the angular shoulder 156 serves as a transition for the different diameters of the threaded portion 152 and the concentric shoulder 154. The concentric shoulder 154 and the angular shoulder 156 are each convex. A convexity of the concentric shoulder 154 and the angular shoulder 156 corresponds to the concavity of the recesses 146 in the receiver 142. When the locking screw 150 is fully engaged, the convex concentric shoulder 154 and the angular shoulder 156 mate with the concave recess 146 across an increased surface area, and in some cases up to an entire surface area of the concave recess 146 between two sequential ridgelines 148 separating adjacent recesses 146.

As shown in the FIG. 8 example, the locking screw 150 engages one of the plurality of recesses 146. In this example, the recess 146 is a recess farthest from a material-removing feature of the indexable insert 140, such as line edge 160 for a milling insert. The receiver could be reoriented such that the recess 146 is farthest from a different material-removing feature of the indexable insert 140, such as an insert corner 162 formed by intersections of corner edges at corners of the polygonal surface.

The body of the indexable insert can be formed from any suitable material. For example, the body can be formed from cemented carbide or from a ceramic. Representative cemented carbides comprise tungsten carbide and a matrix binder comprising cobalt, can comprise approximately 70-97 percent by weight metal carbide and approximately 3-30 percent by weight of a matrix binder material. Metal carbides selected from the group consisting of Cr, Mo, V, Nb, Ta, Ti, Zr, Hf and mixtures thereof can also be included. Representative ceramics include alumina-based or silicon-based ceramics, such as silicon nitride (SiNi).

The indexable insert can have an optional coating on an outer surface of the body. Representative coatings include at least one layer of a Ti-based layer or at least one layer of an $Al_2O_3$-layer. An example of a Ti-based layer is $TiC_xN_yO_z$, where $x+y+z=1$. An example of an $Al_2O_3$-layer is ($\alpha$-$Al_2O_3$, $\kappa$-$Al_2O_3$, or a mixture thereof. The coating can optionally include an outermost TiN layer.

As described herein, features of the indexable insert can be incorporated into milling inserts for milling tools or into turning inserts, boring inserts, grooving inserts and parting inserts for a turning tool, a grooving tool and a parting tool.

On milling tools, for a fixed speed, an increase in density can result in an increased feed rate, decreased cycle and, ultimately increase production. It is desirable to have as high a density as possible provided that machine power is sufficient to turn the tool. Typically, a tool having inserts mounted by a set screw or by a screw passing through the insert has a density of one to three insert pockets per inch diameter of tool head. Higher densities tend to have a negative impact on performance due to a negative compromise with tool geometry to accommodate the mounting mechanism as well as the chip receiving space. In general, however, the locking screw and receiver on the indexable insert disclosed herein allows for a higher density of inserts to be mounted on a material removal tool due to, at least in part, the reduced size of the mounting mechanism contained in the open chip pocket. In some embodiments, a density of greater than 3 to about 4.5, alternatively greater than about 4 (e.g., ±0.25) can be achieved. Contributing to the increase in density is the fact that no extra hardware is associated with the mounting of the exemplary indexable inserts. Items such as wedges and clamps are not necessary for mounting.

Figure 9:
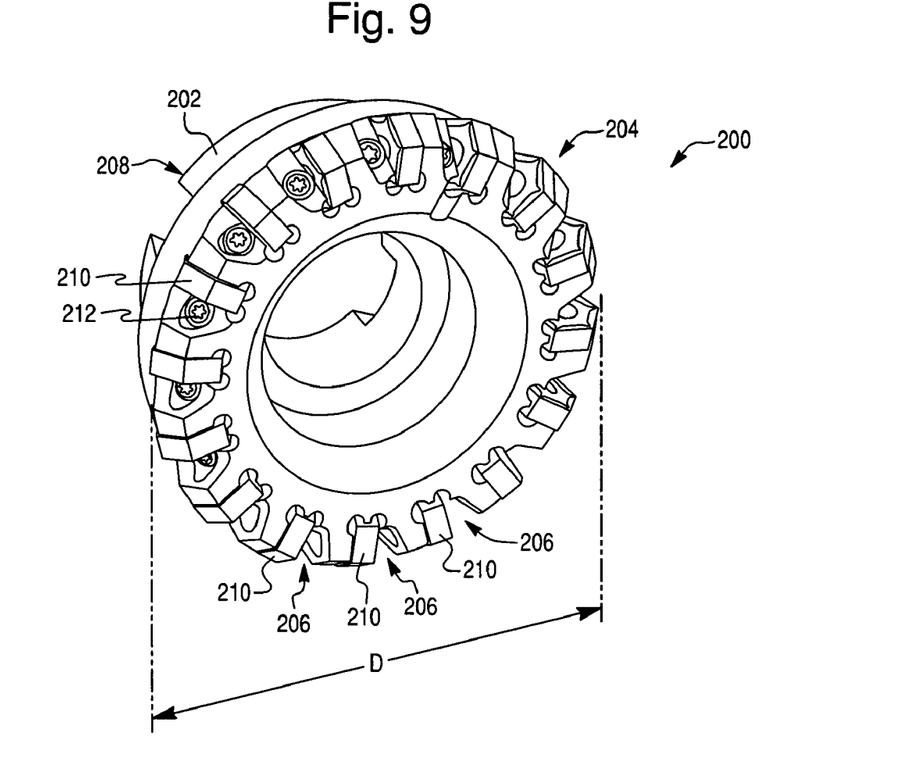
FIG. 9 shows an exemplary embodiment of a material removal tool.

Therefore, in exemplary embodiments as shown in FIG. 9, a material removal tool. The material removal tool 200 comprises a tool body 202 including a head 204 with a plurality of insert pockets 206 at a first end and an axially extending portion 208 at a second end The head 204 has a diameter D, and a plurality of indexable inserts 210. Each of the plurality of indexable inserts 210 is seated in one of the plurality of insert pockets 206. The plurality of indexable inserts 210 are arranged on the head 204 at a density of about 4.5 insert pockets per inch diameter of head.

As used herein density can be determined by the following:

Density=(number of insert pockets)/(diameter of tool head(in inches))

Figure 10:
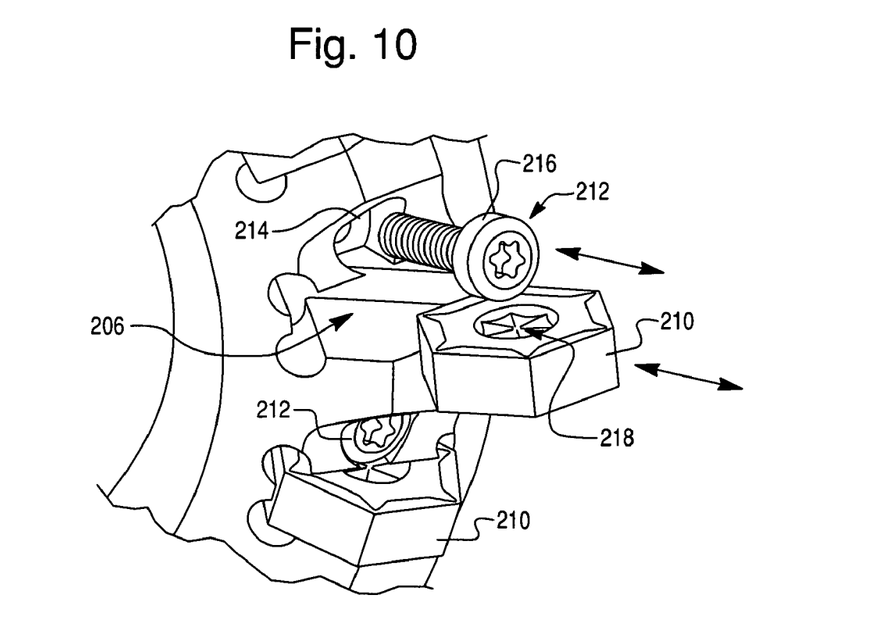
FIG. 10 illustrates an exploded view of an indexable insert, a locking screw and an insert pocket.

The indexable insert 210 is retained in the insert pocket 206 by a locking screw 212. FIG. 10 illustrates an exploded view of an indexable insert 210, a locking screw 212 and an insert pocket 206. The indexable insert 210 is placed into the insert pocket 206 and the locking screw 212 is threaded into the tap hole 214. As the locking screw is tightened, a region of the head 216 of the locking screw 212 contacts a region of a receiver 218 on a surface of the indexable insert 210. For example, the region of the head of the locking screw can be an angular shoulder and a concentric shoulder of the locking screw and the region of the receiver can be a recess. In an exemplary embodiment, the region of the head 216 of the locking screw 212 has a convexity that corresponds to a concavity of the region of the receiver 218. In other exemplary embodiments, the region of the head of the locking screw has a concavity that corresponds to a convexity of the region of the receiver. In a still further exemplary embodiment, the region of the head of the locking screw has a planarity (e.g., one or more planar surfaces) that corresponds to a planarity (e.g., one or more planar surfaces) of the region of the receiver. The receiver 218 and associated recesses can be as illustrated and described herein with respect to any of the embodiments in FIGS. 1-8.

In exemplary embodiments, the diameter of the head of the material removal tool is two to twenty inches, alternatively four to ten inches, and the number of inserts arranged on the too head is between about 9 and about 90, at a density of about 4.5 inserts per inch diameter.

In another exemplary embodiment, a material removal tool comprises a body with a plurality of insert pockets at a first axial end, an indexable insert, and a lock screw for a threaded tap hole. The lock screw, when inserted into the threaded tap hole, engages a region of the concentric shoulder of the lock screw and a region of the angular shoulder of the lock screw against one of the recesses of a receiver of an indexable insert and engages a second region of the concentric shoulder against a surface of the counterbore of the threaded tap hole.

Figure 11:
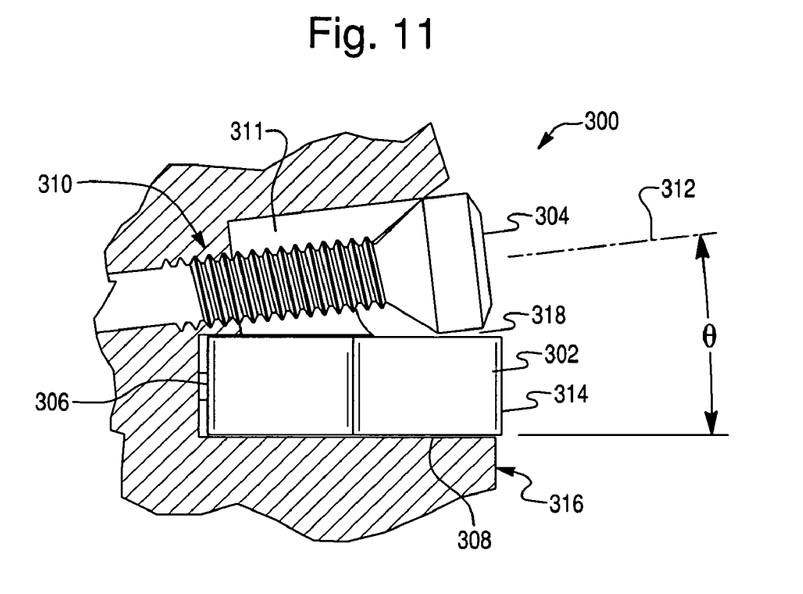
FIGS. 11-13 illustrate an exemplary insert pocket in a material removal tool showing both an indexable insert and a locking screw. In the FIG. 11 view, two side edge surfaces are shown view-on; in the FIG. 12 view, an angled view from above is shown; and in the FIG. 13 view, a cut away view of the indexable insert and the fully inserted locking screw is shown.
Figure 12:
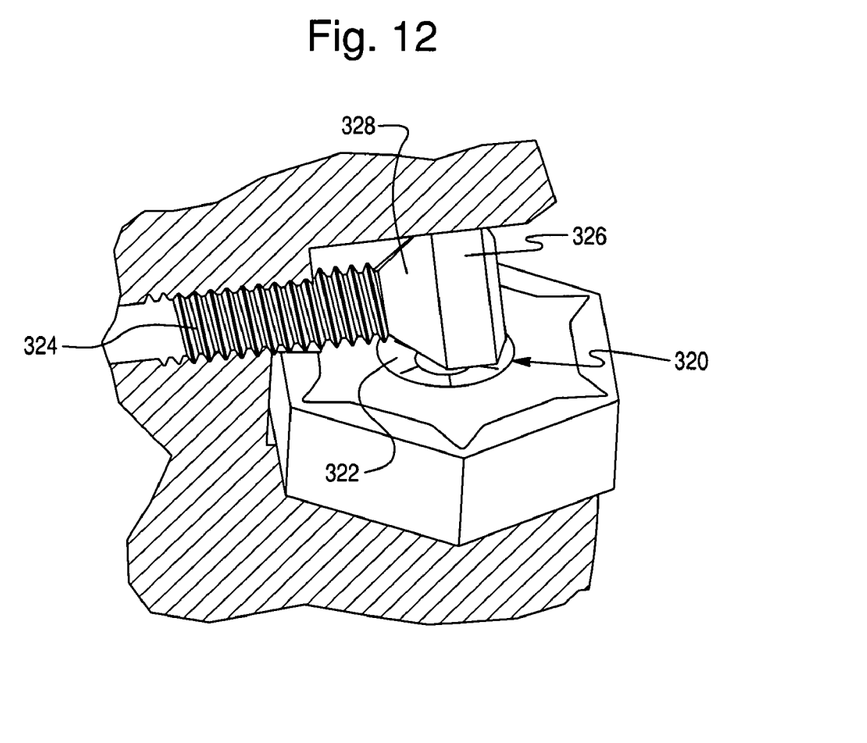
Figure 13:
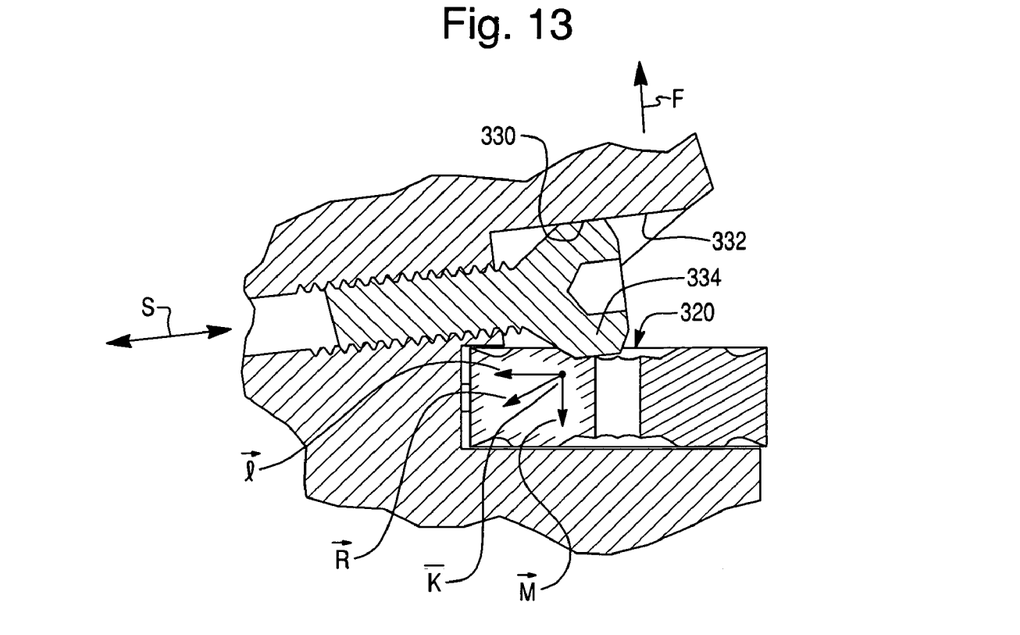

FIGS. 11 to 13 illustrate an exemplary insert pocket 300 in a material removal tool showing both an indexable insert 302 and a locking screw 304. In the FIG. 11 view, two side edge surfaces of the insert and the side of the locking screw are shown view-on; in the FIG. 12 view, an angled view from above is shown; and in the FIG. 13 view, a cut away view of the indexable insert and the fully inserted locking screw is shown.

The insert pocket 300 includes a wall supporting surface 306, a floor supporting surface 308 and a threaded tap hole 310 with a counterbore 311. The threaded tap hole 310 has a centerline 312 oriented at an angle, θ, to the floor supporting surface 308. The indexable insert 302 can be as illustrated and described herein with respect to any of the embodiments in FIGS. 1-8 including having a receiver 320 (shown in FIGS. 12 and 13) for a region of a head of the locking screw in the front polygonal surface or back polygonal surface, the receiver including a plurality of recesses, the recesses being concavely formed, convexly formed or planar or a combination thereof.

In the FIG. 11 view, the back polygonal surface is shown contacting the floor supporting surface 308 and a first one of the plurality of side edge surfaces is shown contacting the wall supporting surface 306. A second one 314 of the plurality of side edge surfaces protrudes radially past an outer peripheral surface 316 of the body. Also seen in FIG. 11 is a clearance 318 between the locking screw 304 and the indexable insert 302 while maintaining at least a portion of the locking screw 304 threaded in the tap hole 310. This clearance 318 results in the ability to insert and remove an indexable insert from an insert pocket while maintaining at least a portion of the locking screw threaded in the tap hole. This facilitates efficient indexing and/or replacement of the indexable insert.

In the FIG. 12 view, the locking screw 304 is further inserted in the tap hole 310. Such partial insertion of the locking screw 304 begins to place the head of the locking screw 304 into the receiver 320, e.g., a portion of the head breaks the plane of the front polygonal surface, such that the indexable insert 302, while not fully seated in the insert pocket 300, also cannot be removed from the insert pocket 300, thereby reducing the risk of falling out or being lost during indexing or change out.

In the FIG. 13 view, the locking screw 304 is fully inserted into the tap hole 310 with the region of the head of the locking screw contacting a recess 322 of the receiver 320. For example, the locking screw 304 includes a threaded portion 324, a concentric shoulder 326 and an angular shoulder 328, the angular shoulder 328 between the threaded portion 324 and the concentric shoulder 326. When inserted into the tap hole 310, the angular shoulder 328 first engages against one of the plurality of recesses 322, causing the protruding portion of the locking screw 304 to flex in a direction F. When further threaded, the flexing of the locking screw 304 is limited by the second region 330 of the concentric shoulder 326 engaging against a surface 332 of the counterbore 311 of the tap hole 310, which also brings the first region 334 of the concentric shoulder 326 into engagement against one of the plurality of recesses 322. Overall, when seated, the lock screw 304 stretches axially along axis S. Also, when seated, the lock screw 304 engaging with one of the plurality of recesses and the surface of the counterbore produces a side locking force against side walls of the insert pocket, e.g., side wall 306 and other side walls of the insert pocket, and produces a clamping force against floor supporting surface 308 of the insert pocket. The locking screw 304 inserted into the threaded tap hole to engage the first region of the concentric shoulder and the region of the angular shoulder against one of the plurality of recesses and to engage the second region of the concentric shoulder against a surface of the counterbore asserts a force against the indexable insert in a tangential direction, an axial direction and a radial direction. The forces generated by the locking screw 304 is shown in FIG. 13 as vectors $\vec{k}$, $\vec{T}$ and $\vec{m}$, respectively. As shown in FIG. 13, vector $\vec{R}$ is the resultant of $\vec{T}$ and $\vec{m}$.

The indexable insert can be mounted in a material removal tool. The type of insert and the type of material removal tool are not limited. Exemplary embodiments of the disclosed material removal tool can be a milling tool and the indexable insert is a milling insert or can be one of a turning tool, a grooving tool and a parting tool and the indexable insert is one of a turning insert, a boring insert, a grooving insert and a parting insert.

An exemplary method to mount an indexable insert on a material removal tool is disclosed. The indexable insert includes a body having a front polygonal surface, a back polygonal surface and a plurality of side edge surfaces joining the front polygonal surface and the back polygonal surface, the intersections of the side edge surfaces and the polygonal surfaces defining line edges of the insert and intersections of sequential side edge surfaces defining corner edges of the insert, and includes a receiver for a region of a head of a locking screw in the front polygonal surface, wherein the receiver includes a plurality of recesses. Examples of indexable inserts are shown and described in connection with FIGS. 1-8 herein. The exemplary method comprises placing the indexable insert on a seating surface of an insert pocket of the material removal tool and threading a locking screw including an angular shoulder and a concentric shoulder into a tap hole to engage a portion of the angular shoulder and a portion of the concentric shoulder with one of the plurality of recesses.

Engaging the portion of the angular shoulder and the portion of the concentric shoulder with one of the plurality of recesses seats the indexable insert in the insert pocket. For example, engaging the portion of the angular shoulder with one of the plurality of recesses flexes the locking screw and engaging the portion of the angular shoulder and the first portion of the concentric shoulder with one of the plurality of recesses and engaging the second portion of the concentric shoulder with a surface of the counterbore stretches the locking screw. In another example, engaging the portion of the angular shoulder and the first portion of the concentric shoulder with one of the plurality of recesses and engaging the second portion of the concentric shoulder with a surface of the counterbore asserts a force against the indexable insert in a tangential direction, an axial direction and a radial direction.

The compressive clamping forces on the insert produced by the disclosed method takes advantage of the inherent compressive properties of the commonly used tool materials. Examples of inserts disclosed herein have been tested by repetitive mounting, indexing and unmounting operations. The indexable inserts have maintained performance for cycles exceeding 10,000 in number. In addition, the interaction of the regions of the head of the locking screw and the recess of the receiver contribute, with the shape of the insert pocket, e.g., the wall surfaces and floor supporting surface, and the counterbore, to properly orient the indexable insert in the insert pocket.

Figure 14:
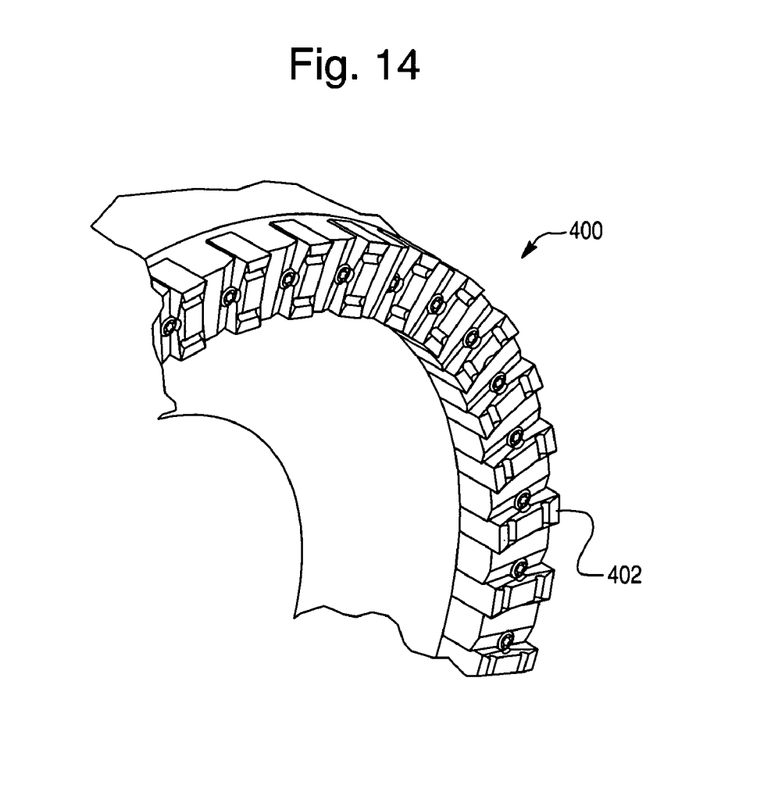
FIGS. 14 and 15 illustrate exemplary embodiments of material removal tools and methods of mounting indexable inserts that relate to these additional polygonal shaped indexable inserts.
Figure 15:
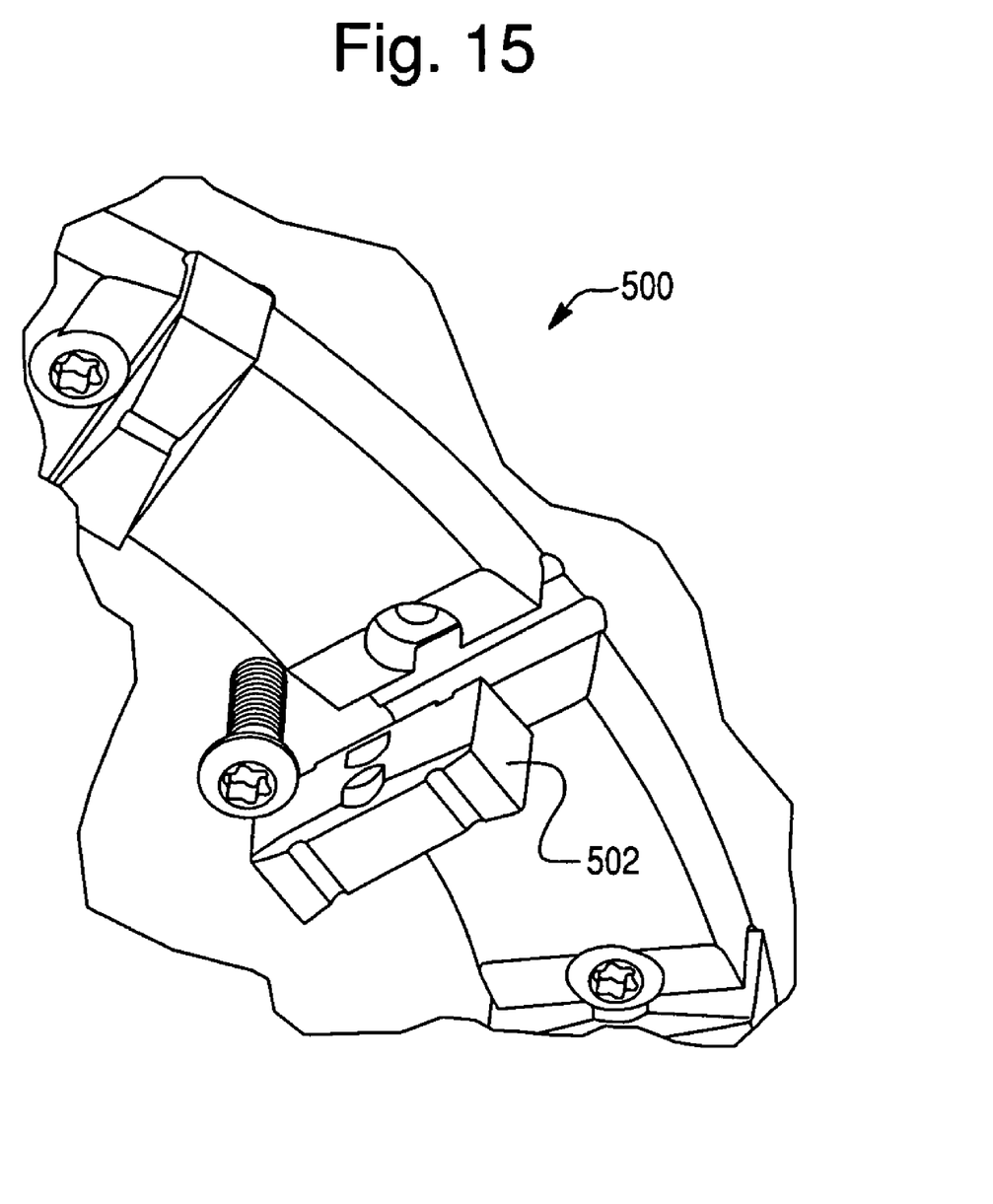

Although shown and described in connection with FIGS. 9-13, which show a polygonal indexable insert as a hexagon, similar figures, discussions and principles can apply to indexable inserts of other polygonal shapes, including but not limited to the polygonal shapes illustrated in FIGS. 1-2 and 4-5. FIGS. 14 and 15 illustrate exemplary embodiments of material removal tools 400, 500 and methods of mounting indexable inserts 402, 502 that relate to these additional polygonal shaped indexable inserts.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. An indexable insert, comprising:
a body including a front polygonal surface, a back polygonal surface and a plurality of side edge surfaces joining the front polygonal surface and the back polygonal surface, the intersections of the side edge surfaces and the polygonal surfaces defining line edges of the insert and intersections of sequential side edge surfaces defining corner edges of the insert; and
a receiver for a region of a head of a locking screw in the front polygonal surface, wherein the receiver includes a plurality of recesses, each recess having a surface that is complimentary to the region of the head of the locking screw,
wherein the plurality of recesses are collocated in a contiguous structure in a radial center of the indexable insert,
wherein the recess of the receiver that is contacted by the region of the head of the locking screw is the recess that is farthest from a material-removing feature of the indexable insert, and
wherein the surface of the recess has a convexity corresponding to a concavity of the region of the head of the locking screw.

2. An indexable insert, comprising:
a body including a front polygonal surface, a back polygonal surface and a plurality of side edge surfaces joining the front polygonal surface and the back polygonal surface, the intersections of the side edge surfaces and the polygonal surfaces defining line edges of the insert and intersections of sequential side edge surfaces defining corner edges of the insert; and
a receiver for a region of a head of a locking screw in the front polygonal surface, wherein the receiver includes a plurality of recesses, each recess having a surface that is complimentary to the region of the head of the locking screw,
wherein the plurality of recesses are collocated in a contiguous structure in a radial center of the indexable insert;
wherein the recess of the receiver that is contacted by the region of the head of the locking screw is the recess that is farthest from a material-removing feature of the indexable insert, and
wherein the surface of the recess has a concavity corresponding to a convexity of the region of the head of the locking screw.

3. The indexable insert as in claim 2 or 1, wherein the region of the head of the locking screw is an angular shoulder and a concentric shoulder of the locking screw.

4. The indexable insert as in claim 2 or 1, wherein the surface of the recess is planar corresponding to a planarity of the region of the head of the locking screw.

5. The indexable insert as in claim 2 or 1, including a bore through the body, the bore oriented axially in the radial center and the plurality of recesses of the receiver are arranged around a periphery of the bore.

6. The indexable insert as in claim 2 or 1, wherein a number of the plurality of recesses is at least the same as a number of sides of the front polygonal surface.

7. The indexable insert as in claim 2 or 1, wherein the body is formed from cemented carbide.

8. The indexable insert of claim 7, including a bore through the body, the bore oriented axially in the radial center and the plurality of recesses of the receiver are arranged around a periphery of the bore.

9. The indexable insert as in claim 2 or 1, wherein the indexable insert is a milling insert.

10. The indexable insert as in claim 2 or 1, wherein the indexable insert is one of a turning insert, a boring insert, a grooving insert or a parting insert.

11. A material removal tool, comprising:
a tool body including a head with a plurality of insert pockets at a first end and an axially extending portion at a second end, the head having a diameter; and
a plurality of indexable inserts, each of the plurality of indexable inserts seated in one of the plurality of insert pockets,
wherein the indexable insert includes a receiver on a surface and a plurality of cutting edges and wherein the receiver has a plurality of regions, each one of the plurality of cutting edges of the indexable insert correlated to a different one of the plurality of regions, wherein the indexable insert is retained in the insert pocket by a locking screw, a region of the head of the locking screw contacting the region of the receiver correlated to the cutting edge, wherein the region of the head of the locking screw has a surface that corresponds to a surface of the region of the receiver, and wherein the indexable insert is retained in the insert pocket by a locking screw, a region of the head of the locking screw contacting a region of a receiver on a surface of the indexable insert, wherein the region of the receiver has a surface that is complimentary to the region of the head of the locking screw.

12. The material removal tool of claim 11, wherein the plurality of indexable inserts are arranged on the head at a density of about 4 inserts per inch diameter of head.

13. The material removal tool of claim 11, wherein the region of the head of the locking screw has a convexity that corresponds to a concavity of the region of the receiver.

14. The material removal tool of claim 11, wherein the region of the head of the locking screw has a concavity that corresponds to a convexity of the region of the receiver.

15. The material removal tool of claim 11, wherein the region of the head of the locking screw is planar corresponding to a planarity of the region of the receiver.

16. The material removal tool of claim 11, wherein the region of the head of the locking screw is an angular shoulder and a concentric shoulder of the locking screw.

17. The material removal tool of claim 16, wherein a region of the concentric shoulder of the locking screw engages a counterbore of a tapped threaded hole for the locking screw.

18. The material removal tool of claim 11, wherein less than a full circumference of the head of the locking screw contacts the region of the receiver on the surface of the indexable insert.

19. The material removal tool of claim 11, wherein the region of the head of the locking screw is an angular shoulder of the locking screw and a concentric shoulder of the locking screw.

20. The material removal tool of claim 11, wherein the region of the receiver correlated to the cutting edge is the region of the receiver closest to the cutting edge.

21. The material removal tool of claim 11, wherein the region of the receiver correlated to the cutting edge is the region of the receiver farthest from the cutting edge.

22. The material removal tool as in claim 12 or 11, wherein the material removal tool is a milling tool and the indexable insert is a milling insert.

23. The material removal tool as in claim 12 or 11, wherein the material removal tool is one of a turning tool, a grooving tool and a parting tool and the indexable insert is one of a turning insert, a boring insert, a grooving insert and a parting insert.

24. The indexable insert as in claim 2 or 1, wherein at least two adjacent recesses are separated by a ridgeline.

25. The indexable insert of claim 24, wherein the ridgeline is oriented such that a projection of the ridgeline intersects at least one of the corner edges of the indexable insert.

26. The indexable insert as in claim 2 or 1, wherein a surface of the recess is conformal to a surface of the region of the head of the locking screw.

27. The indexable insert as in claim 2 or 1, wherein a surface of the recess and a surface of the region of the head of the locking screw are in contact over at least a portion of a surface area of the recess.

* * * * *